(12) United States Patent
Newton

(10) Patent No.: US 9,391,979 B1
(45) Date of Patent: Jul. 12, 2016

(54) MANAGING SECURE CONNECTIONS AT A PROXY SERVER

(71) Applicant: Google Inc., Mountain View, CA (US)

(72) Inventor: Simon Jeffrey Newton, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/739,718

(22) Filed: Jan. 11, 2013

(51) Int. Cl.
  *G06F 21/00* (2013.01)
  *H04L 29/06* (2006.01)

(52) U.S. Cl.
  CPC ........ *H04L 63/0823* (2013.01); *H04L 63/0281* (2013.01)

(58) Field of Classification Search
  CPC .................. H04L 67/2814; H04L 63/0281
  USPC ........................................................ 713/156
  See application file for complete search history.

(56) References Cited

U.S. PATENT DOCUMENTS

| | | | |
|---|---|---|---|
| 8,010,786 B1* | 8/2011 | Ward | H04L 63/0823 713/156 |
| 8,452,956 B1* | 5/2013 | Kersey et al. | 713/153 |
| 8,621,078 B1* | 12/2013 | Mukerji et al. | 709/225 |
| 8,627,063 B2* | 1/2014 | Edstrom et al. | 713/156 |
| 8,799,641 B1* | 8/2014 | Seidenberg et al. | 713/153 |
| 8,887,245 B1* | 11/2014 | Wiltzius et al. | 726/4 |
| 2006/0005239 A1* | 1/2006 | Mondri et al. | 726/13 |
| 2008/0263215 A1* | 10/2008 | Schnellbaecher | 709/229 |
| 2009/0013399 A1* | 1/2009 | Cottrell et al. | 726/12 |
| 2009/0083537 A1* | 3/2009 | Larsen et al. | 713/153 |
| 2010/0077102 A1* | 3/2010 | Lim et al. | 709/240 |
| 2012/0265609 A1* | 10/2012 | Robert | G06Q 30/0257 705/14.49 |
| 2012/0266214 A1 | 10/2012 | Hagiu et al. | |
| 2014/0359741 A1* | 12/2014 | Kistner et al. | 726/7 |

* cited by examiner

*Primary Examiner* — Morshed Mehedi
(74) *Attorney, Agent, or Firm* — John D. Lanza; Foley & Lardner LLP

(57) ABSTRACT

A content distribution network includes a proxy server in communication with one or more content distribution servers. The proxy server services connections to the content distribution servers from one or more client devices. If connection request from a client device seeks a secure transmission that requires a certificate from a content distribution server, the proxy server determines the required certificate and transmits the certificate identification to the content distribution server.

15 Claims, 4 Drawing Sheets

MANAGING SECURE CONNECTIONS AT A PROXY SERVER

BACKGROUND

Online content providers employ one or more servers to distribute content over the Internet to an end user operating a client device. The servers may be networked together to more efficiently provide content to the end user. The content to be distributed may include a document or resource of information suitable for the World Wide Web and accessible through a web browser, a multimedia file for playback or display on the client device of the end user, or any other type of electronic information. As examples, the content may be a web page, a video file, an audio file, or any other type of electronic media.

The content distributor may use a content-distribution network to distribute content to end users. Generally, a content-distribution network is a system of computers that are networked together across the Internet and cooperate for distributing content.

In configuring the content-distribution network, the content for distribution may reside on one or more servers. The content distributor may use one or more proxy servers for accepting incoming connections from the end users and/or for distributing or servicing incoming connections. However, for a single proxy server, or even multiple proxy servers, managing hundreds of thousands of incoming connections is a challenging task. This is especially true for proxy servers that are required to service secure connections, such as Secure Socket Layer ("SSL") connections, between clients and content servers.

BRIEF SUMMARY

Aspects of the embodiments provided below allow for the dynamic management of secured connections over a network. For example, a proxy server may service an SSL connection between a client and content server in a way that allows the proxy server to transmit data to one of many IP addresses at the content server.

In one aspect, a proxy server receives a connection request from a client to establish a connection with a network server. The proxy server may then determine that connection request is for a secure SSL connection and identify the certificate required from the network server to establish the secure connection. The proxy server then transmits the connection request of the client, along with identification of the required certificate, to the content server. Upon receiving the connection request and certificate identification, the content server may then transmit a response that includes the identified certificate.

In another aspect, the proxy server receives connection requests from a first client and a second client for establishing connections with a network server. The proxy server identifies the certificates required from the network server to establish the secure connections with the first and second clients. The proxy server may then transmit first data associated with the connection request of the first client to a first IP address of the network server and transmit second data associated with the connection request of the second client to a second IP address of the network server. In each instance, the proxy server transmits data to the network server identifying the certificates required to make each secure connection. The proxy server then receives content server responses for each connection request, with each response containing the required certificate. The proxy server may then transmit each response to the corresponding client.

In yet another aspect, the proxy server may determine which IP addresses are available at the content server, and then transmit the connection requests and certificate identifications to one of the available IP address.

In still another aspect, the proxy server provides the content server with the certificate identification by including the certificate as meta-data in the connection request.

DETAILED DESCRIPTION

Figure 1:
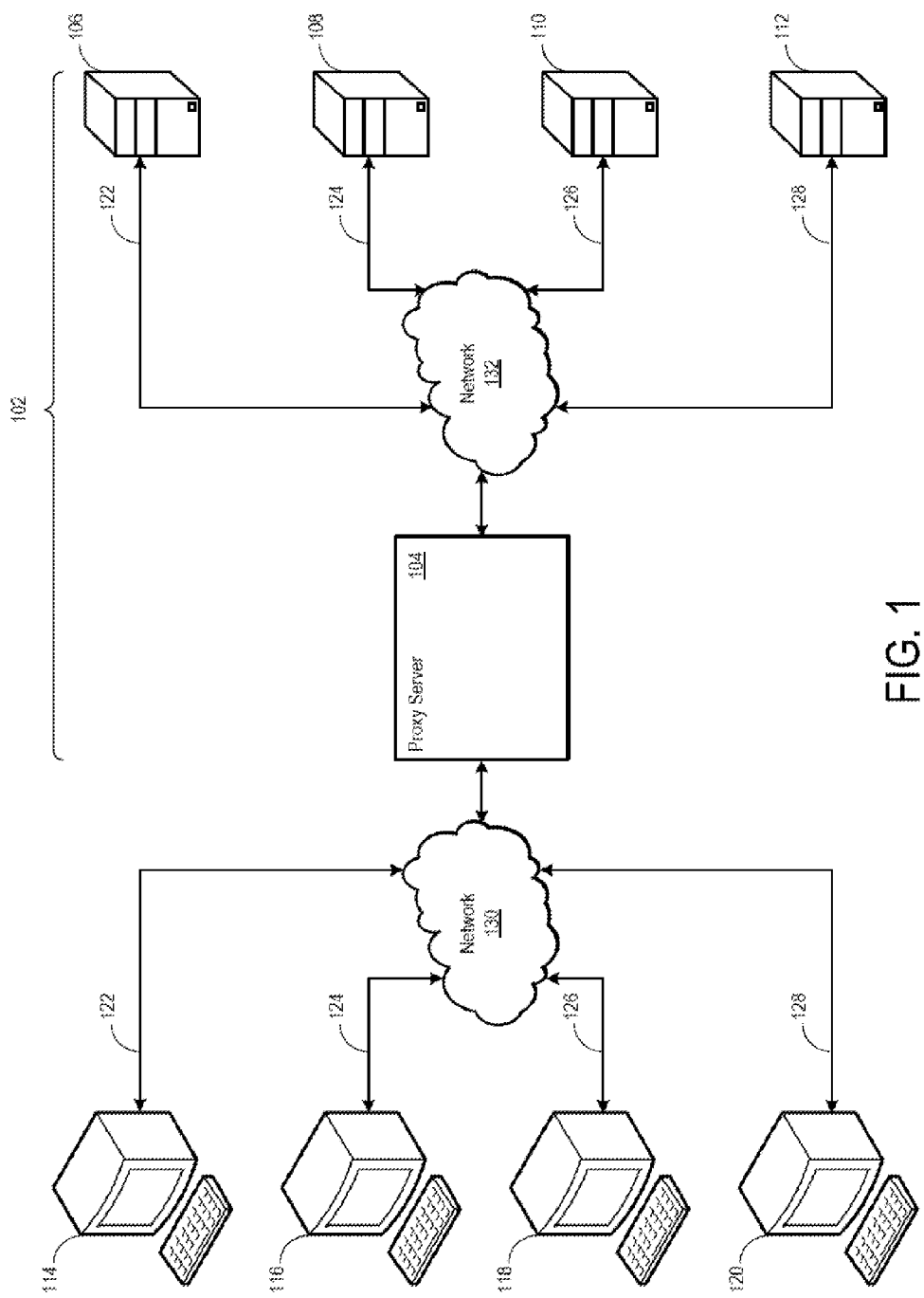
FIG. 1 illustrates one example of a network using a proxy server in communication with multiple client devices.

FIG. 1 illustrates one example of a content distribution network 102 having a proxy server 104 in communication with one or more client devices 114-120 via a first network 130. The proxy server may also be in communication with one or more content distribution servers 106-112, also referred to below as core servers, via a second network 132.

In one implementation, the content distribution network 102 includes the proxy server and the one or more content distribution servers 106-112. However, in an alternative implementation, the content distribution network 102 may also include one or more client devices 114-120. The content distributed by the one or more content distribution servers 106-112 may be any type of electronic content such as Internet webpages, multimedia files, electronic documents, or any other type of electronic content now known or later developed.

The first network 130 and second network 132 may be any combination of networks. For example, the first 130 and second networks 132 may each be a Wide Area Network ("WAN"), such as the Internet; a Local Area Network ("LAN"); a Personal Area Network ("PAN"), or, a combination of WANs, LANs, and PANs. Moreover, the first network 130 and second network 132 may involve the use of one or more wired protocols; wireless protocols, such as 802.11a/b/g/n, Bluetooth, or WiMAX; transport protocols, such as the Transmission Control Protocol ("TCP"); an Internet layer protocol, such as the Internet Protocol ("IP"); application-level protocols, such as the Hypertext Transfer Protocol ("HTTP"), a combination of any of the aforementioned protocols, or any other type of network protocol now known or later developed.

One or more of the client devices 114-120 may be in communication with the one or more content distribution servers 106-112 by way of the proxy server 104. The client devices 114-120 may be any type of client device or combination of client devices. For example, the first client device 114 may be a desktop computer, the second client device 116 may be a mobile phone, the third client device 118 may be a laptop computer, and the fourth client device 120 may be a netbook computer. Moreover, the client devices 114-120 may directly or indirectly communicate with one another via the first network 130.

The client devices 114-120 may communicate with the content distribution servers 106-112 via the proxy server 104 and through the first network 130 and the second network 132. For example, the first client device 114 may communicate with the first content distribution server 106, the second client device 116 may communicate with the second content distribution server 108, and so on. Alternatively, one or more client devices 114-120 may communicate with one or more of the content distribution servers 106-112. For example, the first client device 114 may communicate with both the first content distribution server 106 and the second content distribution server 108; or, the first client device 114 may communicate with all four of the content distribution servers 106-112. Other combinations of communication arrangements are also possible.

In one implementation, the client devices 114-120 establish corresponding connections 122-128 with the proxy server 104 for communicating with the one or more content distribution servers 106-112. The connections 122-128 may involve the use of one or more of the protocols discussed above, a combination of any of the aforementioned protocols, or any other type of network protocol now known or later developed.

In FIG. 1, each of the client devices 114-120 has a corresponding connection with the content distribution servers 106-112. For example, the first client device 114 has first connection 122 with the first content distribution server 106. Similarly, the second client device 116 has first connection 124 with the second content distribution server 108. However, the client devices 114-120 may have more than one connection with one or more of the content distribution servers 106-112. For example, it is possible that the first client device 114 has several connections with the first content distribution server 106 and several connections with the second content distribution server 108. Other arrangements of connections between the client devices 114-120 and the content distribution servers 106-112 are also possible.

The proxy server 104 manages and services the connections 122-128 to be made with the content distribution servers 106-112. In general, servicing the connection may include placing the client device associated with the connection in communication with a content distribution server to receive content requested by a user of the client device. Should the proxy server 104 determine that there are resources available to service the connection; the proxy server 104 may then service the connection.

However, there may be instances where the proxy server 104 has limited resources to service the connection of the client device. For example, a number of client devices 114-120 may be requesting content from the content distribution system 102, the proxy server 104 may make multiple connections 122-128 with multiple core servers 106-112.

Proxy server 104 is responsible for managing secure transmissions between the client devices 114-120 and core servers 106-112, such as through the establishment of an SSL connection. In order to establish an SSL connection, a core server must provide the client device with a certificate that validates the core server as the device with which the client is attempting to connect. On many networks, the SSL certificate for a particular service, such as an e-mail service, is provided via a single IP address at one of the core servers. Accordingly, proxy servers are often required to transmit all SSL requests to one core server IP address, thereby slowing traffic between proxy server and core server. As described further below, proxy server 104 is able to identify what certificate is required by a client device, thereby avoiding the need to send all SSL traffic to a single IP address.

Figure 2:
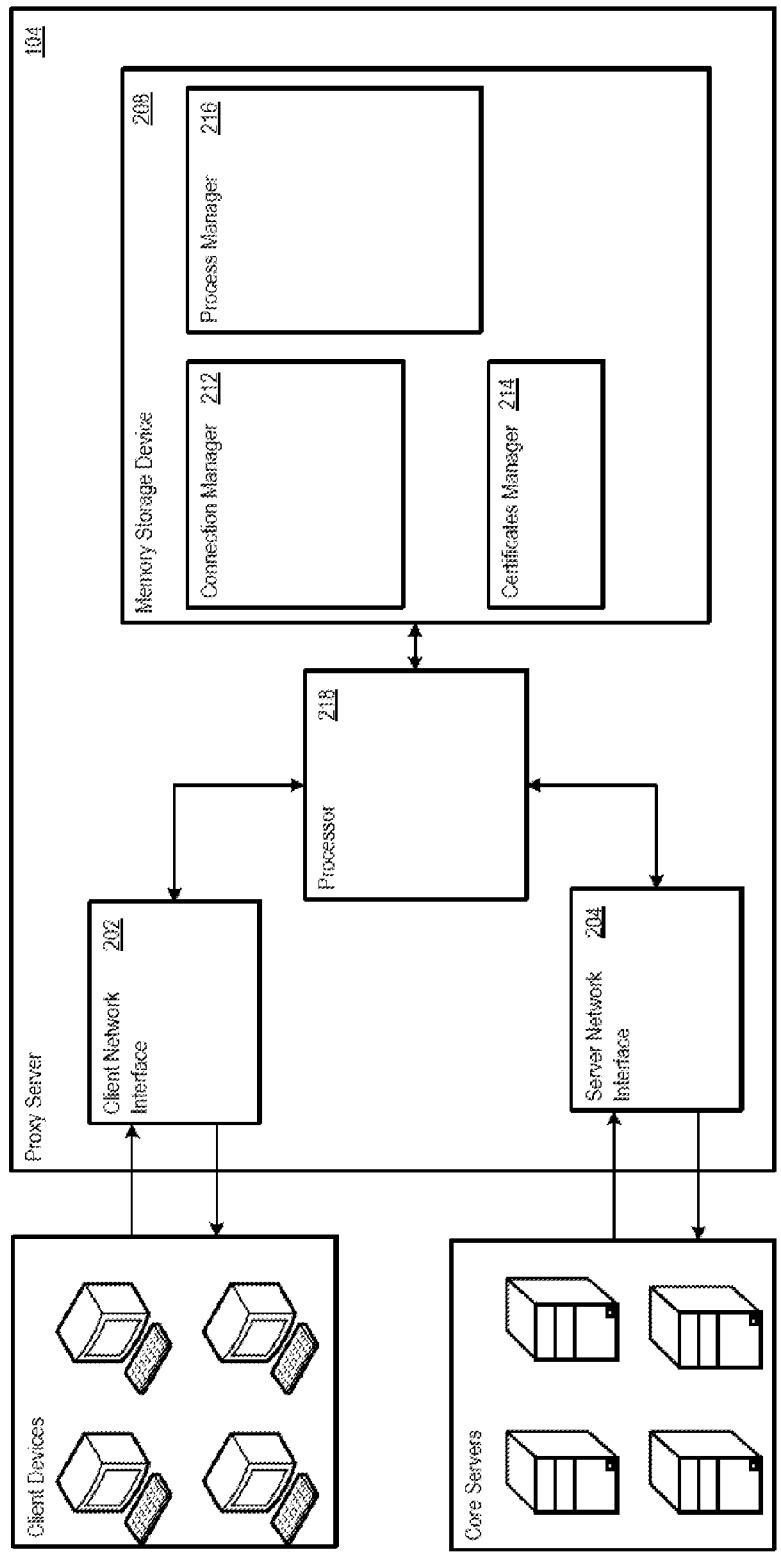
FIG. 2 illustrates one example of the proxy server from FIG. 1.

FIG. 2 illustrates one example of the proxy server 104. In one implementation, the proxy server 104 includes a client network interface 202, a server network interface 204, a processor 206, and a memory storage device 208. The memory storage device 208 may include one or more managers for manage and servicing the connections with the proxy server 104, such as a connection manager 212, a process manager 216, and a memory manager 214. In one implementation, the proxy server 104 is implemented as a web server, such as Apache, which is available from the Apache Software Foundation, located in Los Angeles, Calif., running in an operating system, such as Linux. Alternatively, the proxy server 104 may be implemented as a forward caching proxy, such as Squid, or a reverse caching proxy, such as Varnish.

Although FIG. 2 shows a single proxy server 104 in communication with client devices and content distribution servers, the proxy server 104 may be implemented using more than one proxy server, such as through a distributed network.

The client network interface 202 is operative to receive requests for content from the one or more client devices and to transmit the content from the one or more content distribution servers to the client devices. The client network interface 202 may be a wired network interface, a wireless network interface, or a combination of wired network interfaces and wireless network interfaces. In addition, the client network interface 202 may comprise more than one network interface.

Similarly, the server network interface 204 is operative to transmit the requests for content to the content distribution servers and to receive content from the content distribution servers for transmission to the client devices. The server network interface 204 may be a wired network interface, a wireless network interface, or a combination of wired network interfaces and wireless network interfaces. In addition, the server network interface 204 may comprise more than one network interface. Although FIG. 2 shows the server network interface 204 separate from the client network interface 202, the client network interface 202 and the server network interface 204 may be implemented as a single network interface or across multiple network interfaces as well.

The memory storage device 208 is operative to store managers that manage the connections established with the proxy server 104 and the resources available to the proxy server 104. As mentioned above, the memory storage device 208 may store a connection manager 212, a certificates manager 214, and a process manager 216. Each of the managers 212-216 may be implemented as a single manager, different managers, or a combination of managers. Moreover, one or more of the managers 212-216 may reside on one or more proxy servers. Alternative managers are also possible.

The memory storage device 208 may be any type of computer-readable medium. For example, the memory storage device 208 may be Random Access Memory ("RAM"), Read-Only Memory ("ROM"), a magnetic disk, such as a hard drive, solid-state memory, an optical disc, such as a CD-ROM, Blu-Ray, or DVD, a combination of computer-readable mediums, or any other type of computer-readable medium now known or later developed.

The processor 218 is operative to manage the operations of the connection manager 212, the process manager 216, and the certificate manager 214. Moreover, the processor 218 may handle the processing of the network connections from the client network interface 202 and the server network interface 204. Furthermore, the processor 218 may handle the transfer of data and requests from or to the managers 212-216. As an example, the processor 218 may handle the transfer of a connection from the client network interface 202 to the connection manager 212. As another example, the processor 218 may handle the execution of receiving a connection request at client network interface 202, using connection manager 212 to identify the request as being an SSL connection request, and using certificate manager 214 to identify the certificate that must be provided by a core server via server network interface 204. Other types of operations performable or handled by the processor 218 are also possible. For example, the proxy server 104 may be configured to manage connections so as to notify a core server of the appropriate SSL certificates to be transmitted in establishing a particular transmission with a client device.

Figure 3:
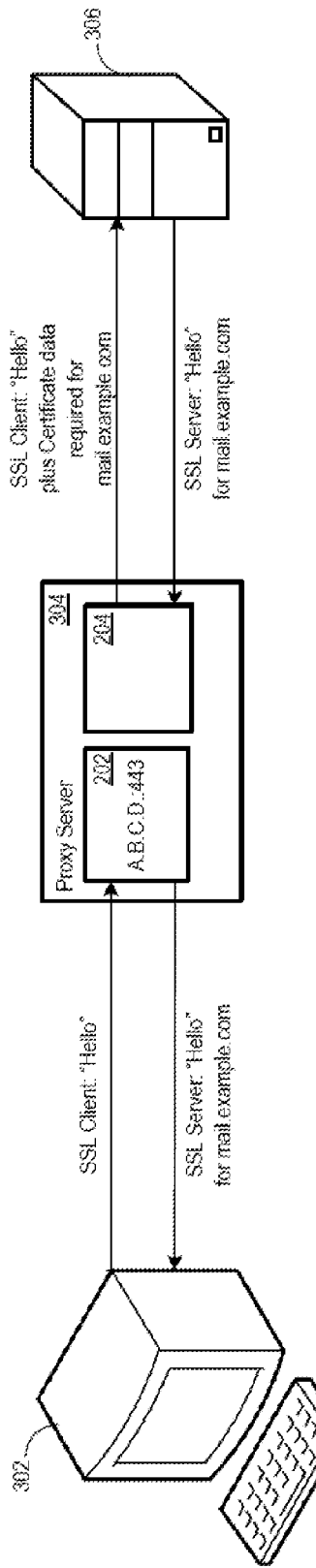
FIG. 3 illustrates one example of communication between a client, a proxy server, and a core server.

FIG. 3 provides an example of an SSL communication between a client 302, and proxy server 304, and a core server 306 in accordance with one embodiment. As shown in FIG. 3, client 302 establishes a TCP connection to proxy server 304 via port 443 at Internet Protocol ("IP") address A.B.C.D. For example, the client's transmission may be in connection with an e-mail service, such as mail.example.com. Client 302 sends a first packet of data ("CLIENT-HELLO") to initiate the SSL session with the proxy server 304. The CLIENT-HELLO is then passed from proxy server 304 to core server 306, along with data designating the required SSL certificate to be used in the transmission with client 302. By designating the required SSL certificate, the SSL data being sent from proxy server 304 to core server 306 is not limited to a particular IP address at core server 306, in that core server 306 uses the certificate data identified by proxy server 304 to access the certificate that must be transmitted to client 302.

Once Core server 306 receives the CLIENT-HELLO and certificate data, core server 306 may then return a SERVER-HELLO for mail.example.com, containing the required SSL certificate. As provided in FIG. 3, the SERVER-HELLO and SSL certificates are transmitted from core server 306 to proxy server 304, and then from proxy server 304 to client 302.

Figure 4:
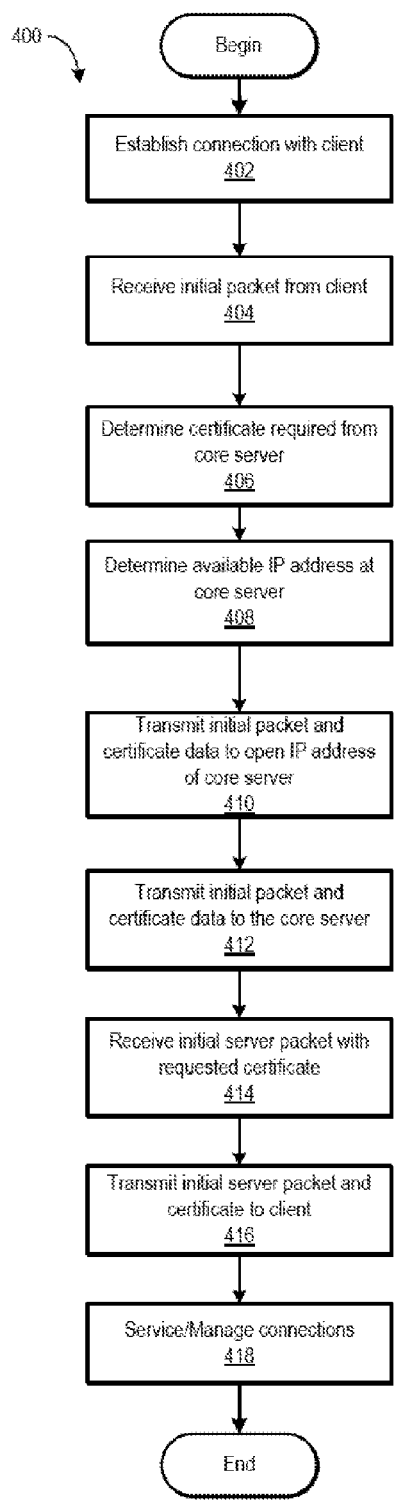
FIG. 4 illustrates one example of process flow of the proxy server for servicing connections.

FIG. 4 provides an example flow chart 400 that may be performed by the proxy server in connection with the data transfer illustrated in FIG. 3. Proxy server may first establish a TCP connection with a client device (Block 402) and receive an initial packet from the client seeking to commence an SSL session with a core server (Block 404). The proxy server may then look up what certificate will be required from the core server (Block 406).

For example, the proxy server may access the certificate manger 214 shown in FIG. 2 to determine that the client is seeking an SSL E-mail transmission and to identify the certificate that must be provided by the core server in connection with the e-mail transmission. Using connection manager 212, proxy server identifies an IP address at the core server that is currently available to receive the transmission and establishes a TCP connection the IP address (Block 408). Proxy server then provides the initial client packet, along with identification of the necessary certificates, to an available IP address of the core server (Block 410). For example, the proxy server may include the E-mail SSL certificate data as meta-data of the initial client packet being transmitted to the core server. The proxy server may alternatively send the core server a digital key, which is used by the core server to identify the required SSL certificate. The SSL Proxy server receives an initial server packet, including the requested SSL certificate (Block 412). The proxy server then transmits the initial server packet and required certificate to the client (Block 414), and the SSL session may proceed (Block 416).

As provided in FIG. 1, proxy server 104 may connect numerous clients, such as clients 114-120, to numerous servers, core server 106-112. Accordingly, flow chart 400 may be repeated for securely connecting any number of clients and core servers.

The systems, components, and logic described above may be implemented in many different ways, including a combination of hardware and software, or as software for installation on any desired operating system including Linux, UNIX, or Windows. The functionality may be implemented in a single system or functionally partitioned across multiple systems. As another example, the components, systems, and logic may be implemented as computer-executable instructions or as data structures in memory and may be stored on, distributed across, or read from many different types of machine-readable media. The machine-readable media may include RAM, ROM, hard disks, floppy disks, CD-ROMs, flash memory or other machine-readable medium. The components, systems and logic may also be encoded in a signal, such as a signal received from a network or partitioned into sections and received in multiple packets communicated across a network.

The systems may be implemented in software, hardware, or a combination of software and hardware. The systems may be implemented in a computer programming language, such as C++, C#, or Java, or any other computer programming language now known or later developed.

Furthermore, the systems may be implemented with additional, different, or fewer components. As one example, a processor or any other logic or component may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems.

Logic, such as programs or circuitry, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

Moreover, one or more networks may be implemented as any combination of networks. A network may be a WAN, such as the Internet; a LAN; a PAN, or a combination of WANs, LANs, and PANs. Moreover, a network may involve the use of one or more wired protocols, such as SOAP; wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of network protocol now known or later developed.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims. Furthermore, while certain operations and functions are shown in a specific order, they may be performed in a different order unless it is expressly stated otherwise.

The invention claimed is:

1. A method for dynamically managing secured connections in a computer system, comprising:

receiving, at a proxy server, connection requests from a first client and a second client for establishing connections with a network server;

determining, at the proxy server, that the connection requests are for secure connections with the network server;

identifying, at the proxy server, a first certificate required from the network server to establish the secure connections with the first client;

identifying, at the proxy server, a second certificate required from the network server to establish the secure connections with the second client;

transmitting, from the proxy server, first data associated with the connection request of the first client to a first IP address of the network server, wherein the transmitted first data includes certificate identification data by which the network server is provided with identification of the first certificate to be sent by the network server to the first client;

transmitting, from the proxy server, second data associated with the connection request of the second client to a second IP address of the network server, wherein the transmitted second data includes certificate identification data by which the network server is provided with identification of the second certificate to be sent by the network server to the second client, wherein the identification of the first certificate is included as at least one of a first digital key and meta-data of the first data, and the identification of the second certificate is included as at least one of a second digital key and meta-data of the second data.

2. The method of claim 1, further comprising:

receiving a first server response to the connection request of the first client, wherein the first server response includes the first certificate;

receiving a second server response to the connection request of the second client, wherein the second server response includes the second certificate;

transmitting the first server response to the first client; and transmitting the second server response to the second client.

3. The method of claim 1, wherein transmitting first and second data further comprises determining that the first and second IP addresses are available at the network server.

4. The method of claim 1, wherein the secure connections are SSL connections.

5. The method of claim 1, wherein the steps of the receiving connection requests and transmitting the first and second data are performed by a proxy server.

6. The method of claim 5, wherein the proxy server is a reverse proxy server.

7. The method of claim 1, wherein at least one of the connection requests is for an E-mail service.

8. A network device for dynamically managing secured connections over a network, comprising:

a plurality of network ports coupled to a network, configured to facilitate communication with at least one client and at least one network server;

a memory storage; and a processor, coupled to the plurality of network ports, for managing operations to:

receive a connection request over at least one of the plurality of network ports from a first client to establish a connection with a network server;

determine that the connection request is for a secure connection;

identify a first certificate, from a plurality of certificates, to be used by the network server to establish the secure connection;

transmit data associated with the connection request of the first client to the network server from at least one of the plurality of network ports, along with identification of the first certificate to be used by the network server to send the first certificate to the first client;

receive, over at least one of the plurality of network ports, a network server response and the first certificate; and transmit, from at least one of the plurality of network ports, the network server response and the first certificate to the first client, wherein the processor is further operable to transmit the identification of the first certificate as at least one of a digital key and meta-data of the data associated with the connection request of the first client.

9. The network device of claim 8, wherein the processor is further operable to:

receive a connection request from a second client to establish a second connection with the network server;

determine that connection request from the second client is for a secure connection;

identify a second certificate required from the network server to establish the second connection; and transmit data associated with the connection request from the second client to the network server, along with identification of the second certificate, the data associated with the connection request of the first client is transmitted to a first IP address of the network server, and wherein the data associated with the connection request of the second client is transmitted to a second IP address of the network server.

10. The network device of claim 8, wherein at least one of the connection requests is for an E-mail service.

11. The network device of claim 8, wherein the memory and processor are part of a proxy server.

12. The network device of claim 11, wherein the proxy server is a reverse proxy.

13. The network device of claim 8, wherein the secure connection is an SSL connection, and wherein the first certificate is an SSL certificate.

14. The network device of claim 8, wherein the processor is further operable to:

select an available server connection at the network server from a plurality of server connections; and transmit data associated with the connection request of the first client to the available server connection.

15. The network device of claim 14, wherein the server connections are IP addresses.

* * * * *